UNITED STATES PATENT OFFICE.

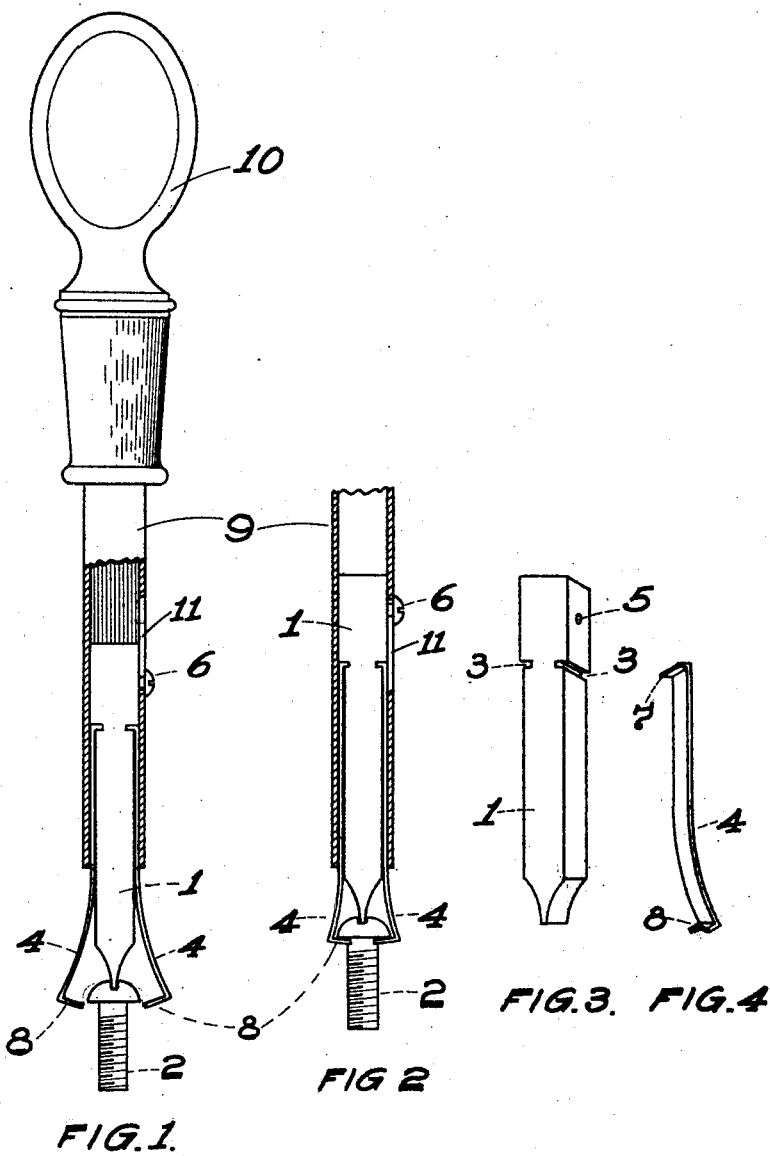

BEN L. BENTLEY, OF FRANKLIN, PENNSYLVANIA.

SCREW DRIVER.

1,412,550.  Specification of Letters Patent.  Patented Apr. 11, 1922.

Application filed August 19, 1921. Serial No. 493,615.

*To all whom it may concern:*

Be it known that I, BEN L. BENTLEY, citizen of the United States, residing at Franklin, in the county of Venango and State of Pennsylvania, have invented certain new and useful Improvements in Screw Drivers, of which the following is a specification.

This invention relates to that class of screw-drivers which are adapted to hold the screw in the proper relation to the point of the bit, especially in places which are difficult or inaccessible to reach with the hand, or where only one hand can be used.

The construction of my improved screw-driver is clearly shown in the accompanying drawings in which:

Fig. 1 is an elevation, partly in section, showing the bit extended and the jaws open for the reception of a screw.

Fig. 2 is a longitudinal section of the square tubular shank of my improved screw-driver showing the bit in elevation, in the retracted position, and with the jaws closed, gripping a screw in readiness to be driven.

Fig. 3 is a perspective view of the bit.

Fig. 4 is a perspective view of one of the jaws.

The construction here shown is substantially as follows:

I provide a bit 1 which is substantially square in cross-section, and formed at one end into a point to enter the slot of a screw, as 2. Near the upper end of said bit and upon two opposite sides thereof, transverse slots 3, 3 are formed; below said slots, and upon the same sides of the bit in which they are formed, an amount of metal is removed equal to, or slightly greater than, the thickness of the jaws 4, so that when said jaws are assembled or placed in position, the bit, together with said jaws, occupies substantially the same cross-sectional area as the upper portion of said bit from which no metal has been removed,—see Fig. 3. Said bit is provided with a suitable hole 5 for the reception of a screw or pin 6, as hereinafter stated.

The jaws 4—see Fig. 4—are identical in form and construction, each having at the upper end thereof a hook 7, which engages one of said slots 3; said jaws are formed of spring steel or other suitably resilient metal, and are curved outwardly at their lower end. Said lower end is formed into a bite 8 to grip a screw that is to be driven.

When said bit and jaws are assembled into their proper relation, they are inserted into one end of a square tubular shank 9, which is preferably cold drawn steel tubing, and in which said bit has longitudinal movement. The other end of said shank is provided with a suitable handle, as 10.

Through one side of said shank 10 a slot 11 is formed, through which said screw 6 extends, which screw is firmly secured in said hole 5. Said screw 6 is free to travel longitudinally of said slot 11, and serves to limit said longitudinal movement of the bit within said shank. It will thus be seen that said bit 1, and said jaws 4, are adapted to be placed in their proper relation to each other, and to be retained therein, also to perform their respective functions simply by inserting them within said tubular shank 9.

As said bit 1 and the jaws 4 engaged thereby are moved longitudinally in said shank, and are placed in the extended position shown in Fig. 1, said jaws 4, because of their resiliency and curved formation, automatically open, so that the head of a screw, as 2, may pass between the bites 8 and the slot thereof be engaged by the point of the bit. After placing the screw in the position shown in Fig. 1, a backward pressure on the same will cause said bit and said jaws to move inwardly in said shank, thus causing said jaws to close so as to firmly engage the head of said screw, and retain it in proper actuative relation to the bit, as shown in Fig. 2. After said screw is driven, a pull upon the handle will cause an outward movement of said bit and said jaws and a consequent releasing of said screw.

In case the point of the bit is to be sharpened or reformed, the screw 6 is removed, and said bit, together with the jaws, may be readily withdrawn from the tubular shank 10, and replaced therein as desired.

I claim the following:

1. A screw-driver comprising in combination, a bit having a rectangular cross-section, a pair of jaws formed from resilient material adapted to hold a screw into actuative relation to said bit, a rectangular, tubular shank in which said bit is carried, has longitudinal movement, and which retains said bit and jaws in their assembled, operative relation, and means limiting said longitudinal movement; the opening and closing movements of said jaws being caused by the co-operative effect of their resiliency and said longitudinal movement.

2. A screw-driver comprising in combination, a bit of rectangular cross-section, a pair of jaws formed from resilient metal adapted to hold a screw into actuative relation to said bit, a rectangular, tubular shank, in which said bit is carried and has longitudinal movement, and readily-removable means limiting said longitudinal movement; the opening and closing movements of said jaws being caused by the co-operative effect of their resiliency and said longitudinal movement.

3. A screw-driver comprising a bit of rectangular cross-section, adapted to be directly engaged by a pair of screw-holding jaws, a pair of resilient jaws adapted to directly engage said bit and to hold a screw in actuative relation thereto, a rectangular, tubular shank in which said bit and said jaws are mounted so as to be turned thereby and have longitudinal movement therein; said jaws being adapted to be open and closed by their resiliency and their extension from and retraction into said tubular shank.

4. A screw-driver comprising in combination, a bit having rectangular cross-section adapted to be directly engaged by a screw-holding jaw, a pair of jaws formed from resilient material adapted to directly engage said bit and to hold a screw into actuative relation thereto, a rectangular, tubular shank in which said bit is carried, has longitudinal movement, retains said bit and said jaws in their assembled, engaged relation, and whereby said bit is turned as in driving a screw, and means limiting said longitudinal movement; the opening and closing movement of said jaws being effected by their resiliency and said longitudinal movement.

5. A screw-driver comprising in combination, a bit of rectangular cross-section adapted to be directly engaged by screw-holding jaws, a pair of jaws formed from resilient material adapted to directly engage said bit and to be retained in operative relation thereto by such engagement also to hold a screw in actuative relation to said bit, a rectangular, tubular shank in which said bit is carried, has longitudinal movement and whereby said bit and said jaws are retained in their assembled operative relation; the opening and closing movements of said jaws being automatically caused by the co-operative effect of their resiliency and said longitudinal movement.

In testimony whereof I affix my signature.

BEN L. BENTLEY.